United States Patent Office 3,361,765
Patented Jan. 2, 1968

3,361,765
ANTHRAQUINONE DYESTUFFS
Kurt Weber, Albert Riegler, and Otto Ruettner, Basel, and Willy Mueller, Riehen, Switzerland, assignors to Ciba Limited, Basel, Switzerland, a Swiss company
No Drawing. Filed Mar. 7, 1963, Ser. No. 263,423
Claims priority, application Switzerland, Mar. 13, 1962, 2,998/62; Feb. 15, 1963, 1,901/63
6 Claims. (Cl. 260—329.2)

The present invention provides new water-insoluble dyestuffs free from sulfonic acid groups but containing at least one group of the formula

—CONH$_2$ which is bound either directly or through an organic radical to one or several radicals of the formula —CONHF, in which formula F represents a radical of a colored organic compound and processes for their manufacture.

The new dyestuffs advantageously correspond to the formula (1)      F(HNOC—R—CONH$_2$)$_n$ in which F represents the radical of a colored organic compound, R represents a direct bond or the radical of an aliphatic, cycloaliphatic, aromatic or heterocyclic carboxylic acid, and $n$ an integer of a value not greater than 5.

The new dyestus are obtainable as follows:

(a) a colored organic compound free from sulfonic acid groups and containing at least one acylatable amino group is reacted with a halide of a polycarboxylic acid in a ratio that ensures that the acylation product still contains at least one carboxylic acid halide group, and said acylation product is then reacted with ammonia, or (b) a colored organic amine free from sulfonic acid groups is acylated with a halide of a carboxylic acid of the formula (2)      HOOC—R(CONH$_2$)$_m$ in which R has the meaning given above and $m$ represents 1 or 2, or (c) a dyestuff intermediate product that contains a radical of the formula (3)      —NHCO—R—CONH$_2$ is converted into the finished dyestuff by suitable reactions, for example, acylation, ring closure or coupling.

As starting materials for methods (a) and (b) there are advantageously used amino-anthraquinones, especially those that contain not more than 5 fused rings, preferably those of the formula (4) 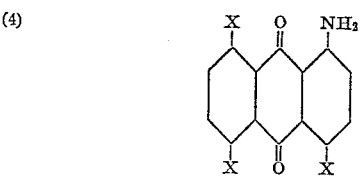

in which one X represents a hydrogen or a halogen atom or a hydroxyl group or an alkoxy, amino or acylamino group and the other symbols X represent hydrogen atoms. As examples of amino-anthraquinones to be used in the process of the invention the following may be mentioned:

1-amino-anthraquinone,
1-amino-3, -4, -5, -6, -7, or -8-chloranthraquinone,
1-amino-4- or -5-methoxyanthraquinone,
1-amino-4-, -5- or -8-benzoylaminoanthraquinone,
1-amino-6:7-dichloranthraquinone,
2-amino-anthraquinone,
1:4-, 1:5-, 1:6-, 1:7- or 1:8-diamino-anthraquinone,
5-amino-1:9-isothiazoleanthrone,
4- or 5-amino-1:9-anthrapyrimidine and
2:6- or 2:7-diamino-anthraquinone.

Further dyestuffs containing amino groups which can be used as starting materials for methods (a) and (b) of the process of the invention are amino-dioxazines, for example, those of the formulae

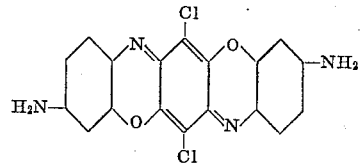

or

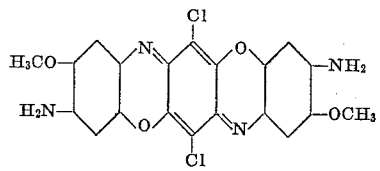

nitro dyestuffs, for example, those of the formulae

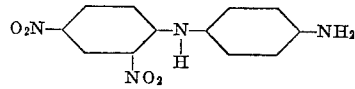

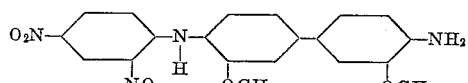

or amino-azo dyestuffs, for example, those of the formulae

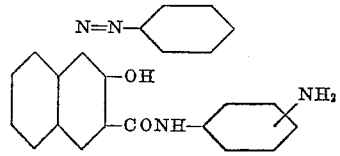

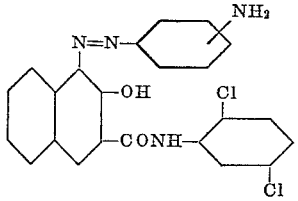

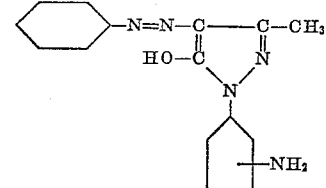

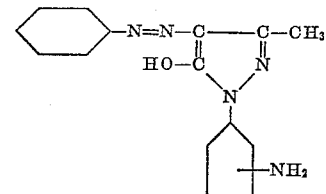

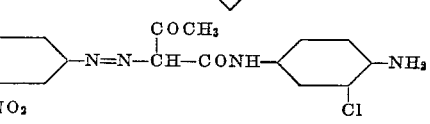

In method (a) the dyestuffs used as starting materials are condensed with a halide of a polycarboxylic acid that is preferably aromatic, for example, naphthalene-1:4-, -1:5- or -2:6-dicarboxylic acid, fluoranthene-4:11-dicarboxylic acid, 4:4'-diphenyl-dicarboxylic acid, 4:4'-azobenzene-dicarboxylic acid, but more especially a polycarboxylic acid of the benzene series, for example, 1:3:5-benzene-tricarboxylic acid, benzene-1:2-, -1:3- or -1:4-dicarboxylic acid, 2-chlorobenzene-1:4-dicarboxylic acid or 2:5-dichlorobenzene-1:4-dicarboxylic acid. The following may also be mentioned: halides of heterocyclic polycarboxylic acids, for example, 2:5-furandicarboxylic acid, 2:5-thiophene-dicarboxylic acid, pyridine-2:3-, -2:4-, -2:5- or -2:6-dicarboxylic acid or thianthrene-dicarboxylic acid, aliphatic dicarboxylic acids, for example, oxalic acid. At least one mole of the poly-carboxylic acid halide is used per acylatable amino group. Thus, for example, one mol of a di- or tricarboxylic acid chloride can be condensed with one mol of a colored monamine, and the one or two carboxylic acid chloride groups remaining in the resulting amide are converted into —CONH₂— groups by reaction with ammonia. It is also possible to condense a tricarboxylic acid chloride with two mols of a colored monamine and to convert the carboxylic acid chloride group remaining in the resulting amide into a —CONH₂— group.

The reaction is advantageously carried out in an inert organic solvent, for example, nitrobenzene, orthodichlorobenzene or trichlorobenzene, if necessary, in the presence of an agent capable of binding acid, for example, pyridine and its homologues, dimethylaniline or quinoline. The reaction is advantageously performed at a raised temperature. It is advantageous to use a large excess of polycarboxylic acid halide.

The further reaction of the intermediate product so obtained is advantageously effected by means of ammonia either dissolved or suspended in one of the aforementioned inert solvents, advantageously at a temperature above 100° C. and, if necessary, under superatmospheric pressure. Since the final product is insoluble in the solvent, even at an elevated temperature, it can be isolated by filtration.

In method (b) of the process of the invention, the aforesaid amines are condensed with a halide of a carboxylic acid of the formula (2), in which R represents, for example, the radical of one of the di- and polycarboxylic acids of the kind defined. Thus, for example, the carboxylic acid chloride of the formula

can be condensed with a colored monamine in a molar ratio of 1:1, or a carboxylic acid chloride of the formula

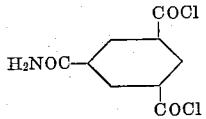

can be condensed with a colored monamine in a molar ratio of 1:2.

These reactions are likewise advantageously carried out in an inert organic solvent with the application of heat, in which process the desired final products are obtained directly.

In method (c) of the process of the invention, a dyestuff intermediate product that contains the radical of the formula

—NHCO—R—CONH₂

(6)

is converted into the finished dyestuff by suitable reactions. This is effected, for example, in such a manner that an amine of the formula

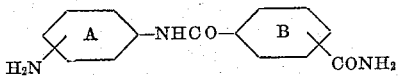

in which the radical B and especially the radical A may contain substituents, for example, halogen atoms, or alkoxy groups, is condensed with a halide of a dyestuff carboxylic acid, for example, with azo-dyestuff carboxylic acid chlorides of the formulae

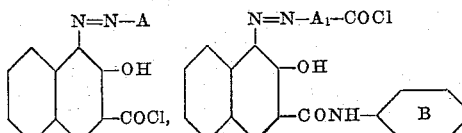

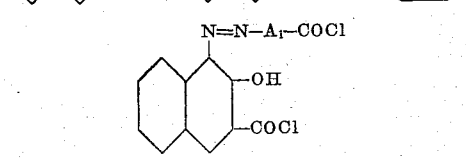

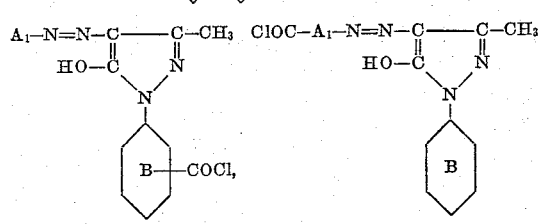

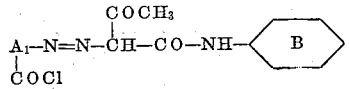

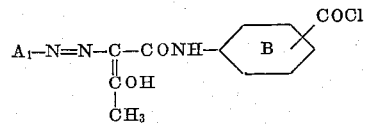

in which formulae A₁ represents radicals of diazo components, especially those of the benzene series, that are free from sulfonic groups, and the benzene radicals B can contain further substituents that do not impart solubility in water.

Furthermore, the diazo compound of an amine of the Formula 5 can be coupled with a coupling component that is free from sulfonic groups, for example, with a β-hydroxynaphthoic acid arylide, a phenyl-pyrazolone or an acetic acid arylide.

An amine of the Formula 5 can also be used in the preparation of nitro dyestuffs, for example, the dyestuff of the formula

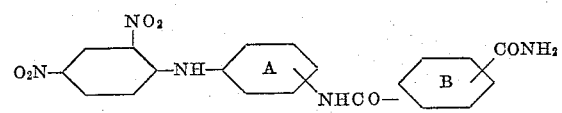

is obtained by condensation with 2:4-dinitrochlorobenzene.

Finally, an amine of the Formula 5 can be converted into a dyestuff intermediate product of the formula

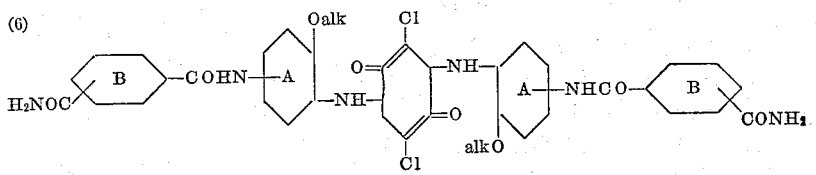

by reaction with chloranil in a molar ratio of 2:1, which product can be converted into a dioxazine of the formula (7)
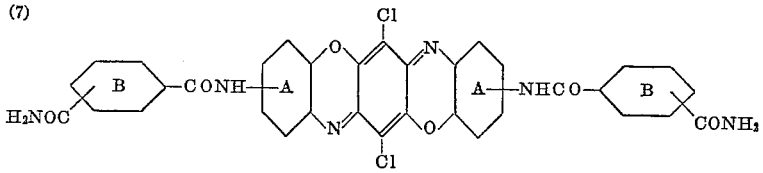

by treating, according to known methods, with agents that cause ring closure, for example, benzoyl chloride or thionyl chloride. In the Formulae 6 and 7, the rings A, in particular, can contain further substituents, for example, halogen atoms or alkoxy groups.

The new dyestuffs are valuable pigments that can be used for a very wide variety of purposes, for example, they can be used in a finely divided form for the spin dyeing of viscose rayon, cellulose ethers and cellulose esters, polyamides, polyurethanes and polyesters, and for the preparation of colored lacquers or as lake formers. They may also be used for dyeing solutions and products made from cellulose acetate, nitro-cellulose, natural and synthetic resins such as polymerisation resins or condensation resins, for example, aminoplasts, alkyd resins, phenoplasts, poly-olefines such as polystyrene, polyvinylchloride, polyethylene, polypropylene, polyacrylonitrile and rubber, casein, silicones and silicone resins. They can also advantageously be used in the manufacture of colored pencils, cosmetic preparations and laminated sheets.

Those dyestuffs obtained by the process of the invention that contain an anthraquinone radical as the color radical are also suitable for use as vat dyestuffs.

Unless otherwise stated, the parts and percentages in the following examples are by weight:

*Example 1*

8 parts of finely powdered 1-amino-anthraquinone were introduced in small portions, while stirring well, into a mixture of 20 parts of terephthaloyl chloride and 80 parts of dry nitrobenzene at 80° C. The mixture was maintained at 95 to 100° C. until the amino compound could not be detected (about 2 hours). After cooling, the yellow crystals were filtered off and freed from adherent acid chloride by washing with dry nitrobenzene. 11 parts of the condensation product so prepared were stirred in 200 parts of dry nitrobenzene, and ammonia was introduced into the mixture at 100 to 110° C. in the course of 15 hours. The precipitated crystalline product was filtered hot, washed successively with nitrobenzene, alcohol and water, and then dried. The dyestuff so obtained of the formula

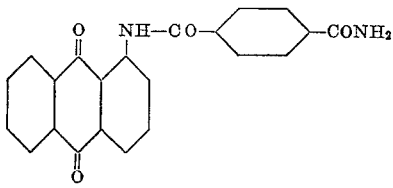

colored plasticized polyvinyl chloride yellow tints possessing a good fastness to light and a very good fastness to migation. Compared with the unsubstituted 1-benzoyl-amino-anthraquinone, the dyestuff showed a substantial improvement in respect of its fastness to migration.

By using 2:5-dibromoterephthaloyl chloride instead of terephthaloyl chloride, a dyestuff having similar properties was obtained.

By using 1:3:5-benzene-tricarboxylic acid trichloride instead of terephthaloyl chloride, a dyestuff was obtained of the formula

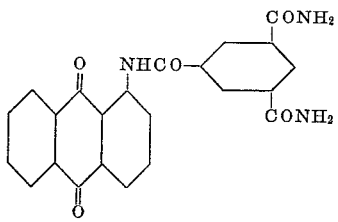

that likewise colored polyvinyl chloride yellow tints possessing very good properties of fastness.

*Example 2*

10 parts of the condensation product prepared as described in the first paragraph of Example 1 from 1 mol of 1-amino-5-benzoylamino-anthraquinone and 1 mol of terephthaloyl chloride in nitrobenzene at 100° C. were reacted with ammonia at 100 to 110° C. in 200 parts of nitrobenzene. The dyestuff so obtained of the formula

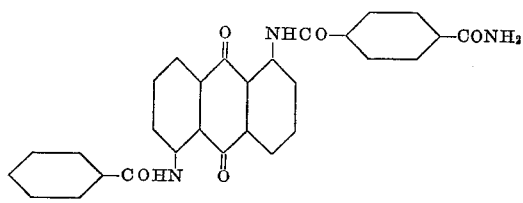

colored plasticized polyvinyl chloride yellow tints possessing a good fastness to light and a very good fastness to migration.

*Coloration process.*—65 parts of polyvinyl chloride, 35 parts of dioctylphthalate and 0.2 part of the dyestuff obtained as described in the first paragraph were stirred together and then worked to and fro for 7 minutes on a two-roller calender at 140° C. A yellow foil possessing a very good fastness to light and a very good fastness to migration was obtained.

*Example 3*

12 parts of the condensation product prepared as described in the first paragraph of Example 1 from one mol of 1-amino-5-benzoylamino-anthraquinone and 1 mol of isophthaloyl chloride in nitrobenzene at 100° C. were reacted with ammonia at 100 to 110° C. in 200 parts of nitrobenzene as described in Example 1. The dyestuff so obtained of the formula

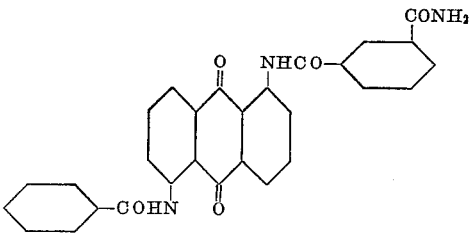

colored plasticized polyvinyl chloride yellow tints possessing good properties of fastness.

*Dyeing prescription.*—(Vat dyeing on cotton). 4 parts of the dyestuff obtained in the manner described in the first paragraph were vatted at 25° C. in 500 parts of water with 15 parts of sodium hydrosulfite in the presence of 2.5 parts by volume of 10% sulfonated castor oil and 24 parts by volume of 30% sodium hydroxide solution. The stock vat so obtained was added to 3000 parts of water. 100 parts of cotton were dyed for 1 hour at 25° C. in the dyebath so prepared, and 480 parts of a 25% aqueous sodium chloride solution were added 15 minutes after the commencement of dyeing. The cotton was then squeezed, oxidized in the air, acidified, rinsed, and then soaped at the boil. The cotton was dyed a strong yellow and the dyeing possessed very good properties of fastness.

*Example 4*

15 parts of the condensation product prepared as described in the first paragraph of Example 1 from 1 mol of 1-amino-4-benzoylamino-anthraquinone and 1 mol of terephthaloyl chloride in nitrobenzene at 100° C. were reacted with ammonia at 100 to 100° C. in 200 parts of nitrobenzene as described in Example 1. The dyestuff so obtained of the formula

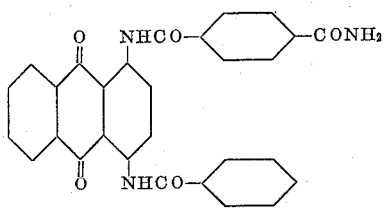

colored plasticized polyvinyl chloride ruby-red tints possessing very good properties of fastness and dyed cotton from a vat bordeaux tints possessing very good properties of fastness.

By using 1-amino-4-para-chlorobenzoylamino-anthraquinone instead of 1-amino-4-benzoylamino-anthraquinone, a dyestuff possessing very similar properties was obtained.

*Example 5*

8 parts of finely powdered 1:5-diamino-anthraquinone were introduced in small portions, while stirring well, into a mixture of 40 parts of terephthaloyl chloride and 70 parts of dry nitrobenzene at 80° C. The mixture was maintained at 100 to 105° C. until the amino-compound could no longer be detected (about 2 hours). After cooling, the yellow crystals were filtered and freed from adherent acid chloride by washing with dry nitrobenzene. 15 parts of the condensation product so prepared were reacted with ammonia at 100 to 110° C. in 200 parts of nitrobenzene as described in the second paragraph of Example 1. The dyestuff so obtained of the formula

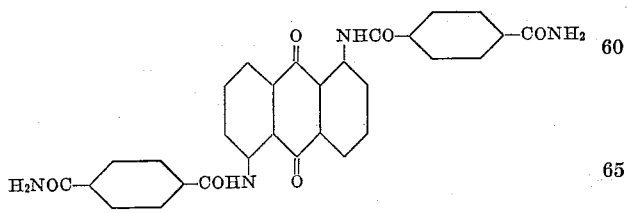

colored plasticized polyvinyl chloride yellow tints possessing a good fastness to light and an excellent fastness to migration.

By using furan- or thiophene-2:5-dicarboxylic acid dichloride instead of terephthaloyl chloride dyestuffs with similar properties were obtained.

*Example 6*

13 parts of the condensation product prepared as described in the first paragraph of Example 5 from 1 mol of 1:5-diamino-anthraquinone and 2 mols of isophthaloyl chloride were reacted with ammonia at 100 to 110° C. in 200 parts of nitrobenzene as described in Example 1. The dyestuff so obtained of the formula

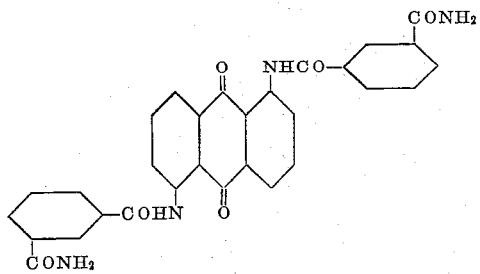

colored plasticized polyvinyl chloride yellow tints possessing a good fastness to light and an excellent fastness to migration.

*Example 7*

15 parts of the condensation product prepared as described in the first paragraph of Example 5 from 1 mol of 1:4-diamino-anthraquinone and 2 mols of terephthaloyl chloride were reacted with ammonia at 100 to 110° C. in 200 parts of nitro-benzene as described in the second paragraph of Example 1.

The dyestuff so obtained of the formula

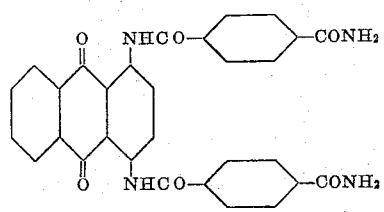

colored plasticized polyvinyl chloride red tints possessing a good fastness to light and an excellent fastness to migration.

*Example 8*

10 parts of the condensation product prepared as described in Example 1 from 1 mol of 1-amino-4-hydroxyanthraquinone and 1 mol of terephthaloyl chloride in nitrobenzene at 45° C. were reacted with ammonia at 95 to 100° C. in 200 parts of nitrobenzene as described in Example 1. The dyestuff so obtained of the formula

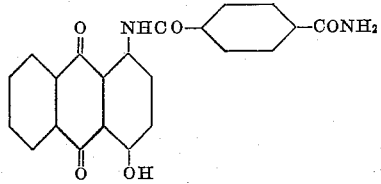

colored plasticized polyvinyl chloride red tints possessing a very good fastness to light and a good fastness to migration.

*Example 9*

The dyestuffs listed in the following table were obtained in an analogous manner by reacting the corresponding monoamino or diamino compound with terephthaloyl chloride in a molar ratio of 1:1 or 1:2 and subsequently reacting the remaining acid chloride group with ammonia. The dyestuffs so obtained when worked into polyvinyl chloride yielded tints possessing a good fastness to migration and to light.

| No. | Dyestuff formula | Tint in polyvinyl chloride |
|---|---|---|
| 1 | 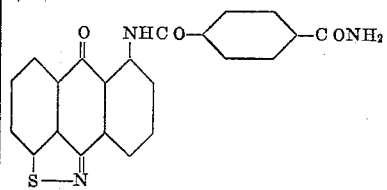 | Yellow. |
| 2 | 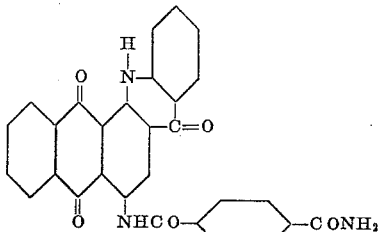 | Blue. |
| 3 | 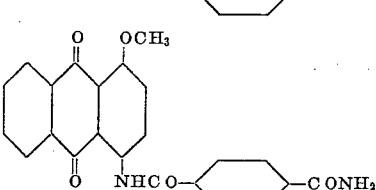 | Orange. |
| 4 | 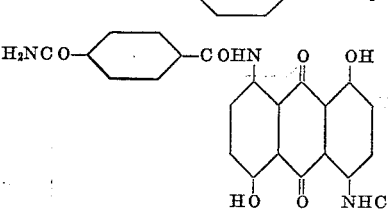 | Reddish blue. |
| 5 | 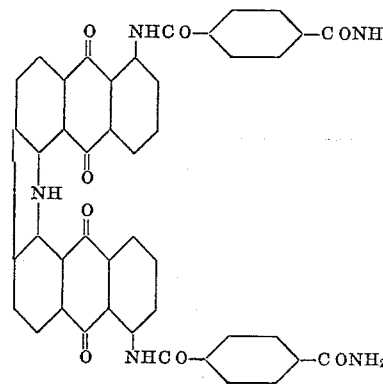 | Brown. |
| 6 | 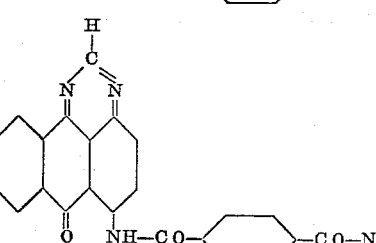 | Yellow. |
| 7 | 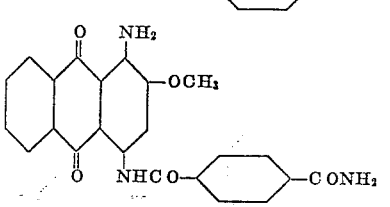 | Brown. |
| 8 | 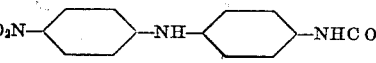 | Do. |

| No. | Dyestuff formula | Tint in polyvinyl chloride |
|---|---|---|
| 9 | | Blue-violet. |
| 10 | | Do. |
| 11 | | Claret. |
| 12 | | Do. |
| 13 | | Red. |

Example 10

2.03 parts of terephthalic acid dichloride were dissolved in 150 parts of ortho-dichlorobenzene and to the solution were added in small portions at 40 to 45° C., while stirring, 3.54 parts of the aminoazo dyestuff of the formula

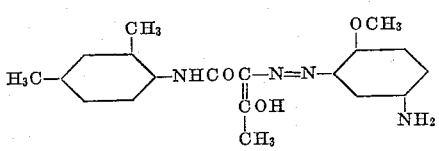

After a short time, the mono-condensation product crystallized from the yellow solution. The mixture was stirred for 1 hour at 40 to 45° C., then heated to 90 to 95° C. and 5 parts of concentrated ammonia added. The crystalline suspension of the mono-condensation product was transformed into a thick, bright yellow magma of the di-condensation product. After 15 minutes, the magma was suction-filtered while hot, the filter residue washed with hot dichlorobenzene until the filtrate ran colorless, the dichlorobenzene extracted with methanol, and the filter residue finally washed with hot water. The yield was 4.6 parts of a dyestuff of the formula

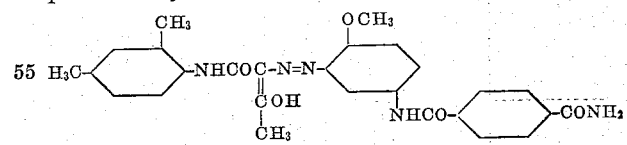

This dyestuff colored plastics such as polyvinyl chloride pure greenish yellow tints possessing an excellent fastness to migration.

Example 11

2.3 parts of terephthalic acid dichloride were dissolved in 200 parts of ortho-dichlorobenzene and to the solution were added at room temperature, while stirring well, 5.5 parts of the amino-azo dyestuff of the formula

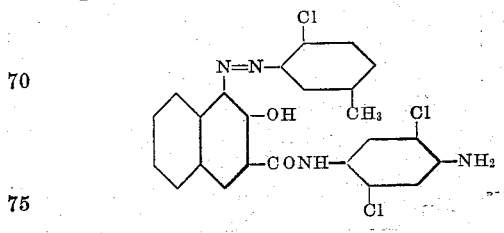

After a short time, the mono-condensation product precipitated from the orange-red solution in the form of red-orange crystals. The mixture was stirred for 2 hours at 30 to 40° C., then heated to 90 to 95° C. and 2 parts of concentrated ammonia added. The mixture was transformed into a thick, light red magma of the di-condensation product. After stirring for 15 minutes, the magma was suction-filtered, and washed with hot dichlorobenzene until the filtrate ran colorless. The dichlorobenzene was then extracted with cold methanol, and the residue finally washed with hot water. The yield was 7 parts of a dyestuff of the formula

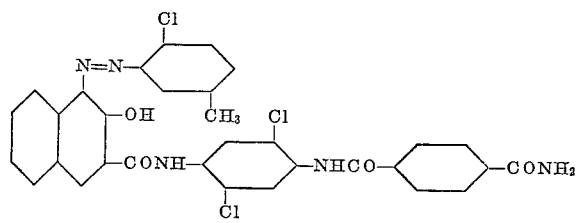

which then worked into plastics such as polyvinyl chloride, gave yellowish red tints possessing a very good fastness to migration.

*Example 12*

40.3 parts of the monoazo dyestuff prepared by coupling diazotized 5-amino-2:4-dichlorobenzoic acid with 2:3-hydroxynaphthoic acid were heated for 2 hours at 115 to 120° C., while stirring, in admixture with 500 parts of ortho-dichlorobenzene, 1 part of dimethyl-formamide and 24 parts of thionyl chloride. After cooling the reaction mixture, the homogeneous crystalline precipitate of the dicarboxylic acid chloride of the dyestuff was isolated by filtration and then dried in vacuo at 50 to 60° C. 1.78 parts of the di-acid chloride so obtained were introduced into 120 parts of ortho-dichlorobenzene while stirring. A hot solution of 2.8 parts of 1-amino-2:5-dimethoxy-4 - (4'-aminocarbonylbenzoylamino)-benzene in 200 parts of ortho-dichlorobenzene was then poured in and the mixture heated for 16 hours at 140 to 145° C. in a bath. The pigment so formed was filtered hot, washed with hot ortho-dichlorobenzene, ethanol and water, and then dried. 3.95 parts (98.9% of the theoretical yield) of a dark red powder was obtained that was very sparingly soluble in organic solvents and yielded a red tint possessing a very good fastness to migration and light when worked into a polyvinyl chloride foil.

The dyestuff corresponded to the formula

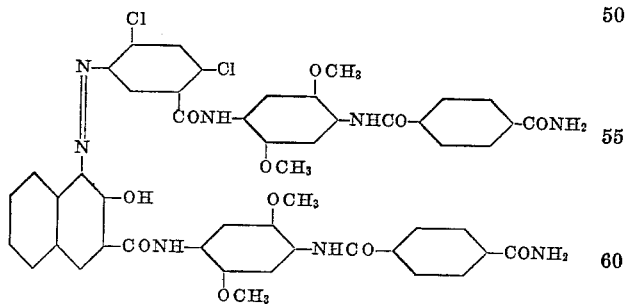

What is claimed is:

1. An anthraquinone dyestuff of the formula

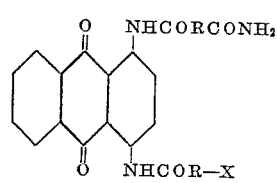

in which R is a member selected from the group consisting of meta-phenylene, para-phenylene and 2,5-thiophenylene and X is a member selected from the group consisting of hydrogen, chlorine and —$CONH_2$.

2. An anthraquinone dyestuff of the formula

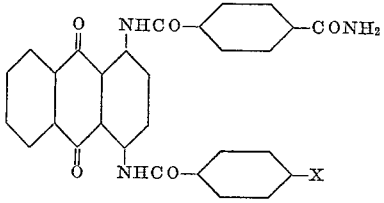

in which X is a member selected from the group consisting of hydrogen, chlorine and —$CONH_2$.

3. The anthraquinone dyestuff of the formula

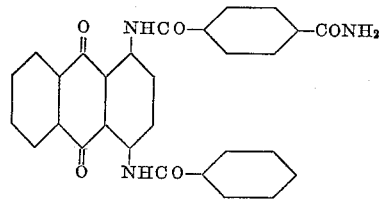

4. The anthraquinone dyestuff of the formula

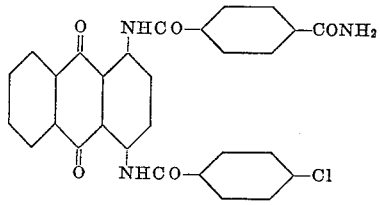

5. The anthraquinone dyestuff of the formula

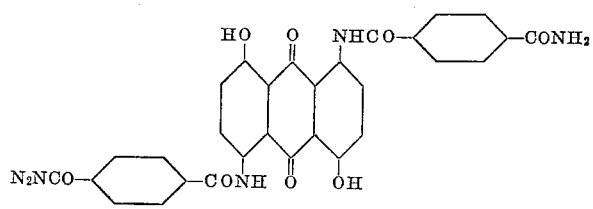

6. The anthraquinone dyestuff of the formula

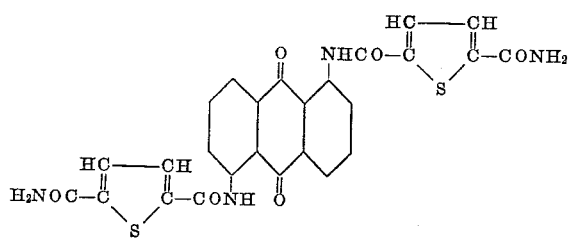

References Cited

UNITED STATES PATENTS

| 2,123,375 | 7/1938 | Mieg et al. | 260—377 |
| 2,713,059 | 7/1955 | Gunthard | 260—372 |
| 3,022,298 | 2/1962 | Mory et al. | 260—246 |
| 3,065,229 | 11/1962 | Ronco | 260—246 |
| 3,078,281 | 2/1963 | Braun et al. | 260—372 |

OTHER REFERENCES

Venkataraman: "Synthetic Dyes," vol. 2, pp. 786–91, 891 (1952) (Academic Press).

Modern Plastics Encyclopedia, vol. 40 (Sept. 1962) pages 490 and 493.

Modern Plastics Encyclopedia, vol. 41 (Sept. 1963), page 402.

JAMES A. PATTEN, *Primary Examiner.*

J. RANDOLPH, *Examiner.*

R. T. BOND, *Assistant Examiner.*

UNITED STATES PATENT OFFICE

CERTIFICATE OF CORRECTION

Patent No. 3,361,765                January 2, 1968

Kurt Weber et al.

It is certified that error appears in the above identified patent and that said Letters Patent are hereby corrected as shown below:

Column 14, lines 38 to 43, the left-hand portion of the formula should appear as shown below:

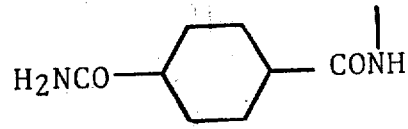

Signed and sealed this 25th day of November 1969.

(SEAL)
Attest:

Edward M. Fletcher, Jr.
Attesting Officer

WILLIAM E. SCHUYLER, JR.
Commissioner of Patents